A. C. COX.
STEERING MECHANISM FOR WHEELED VEHICLES.
APPLICATION FILED FEB. 24, 1915.
1,175,716.
Patented Mar. 14, 1916.
2 SHEETS—SHEET 1.
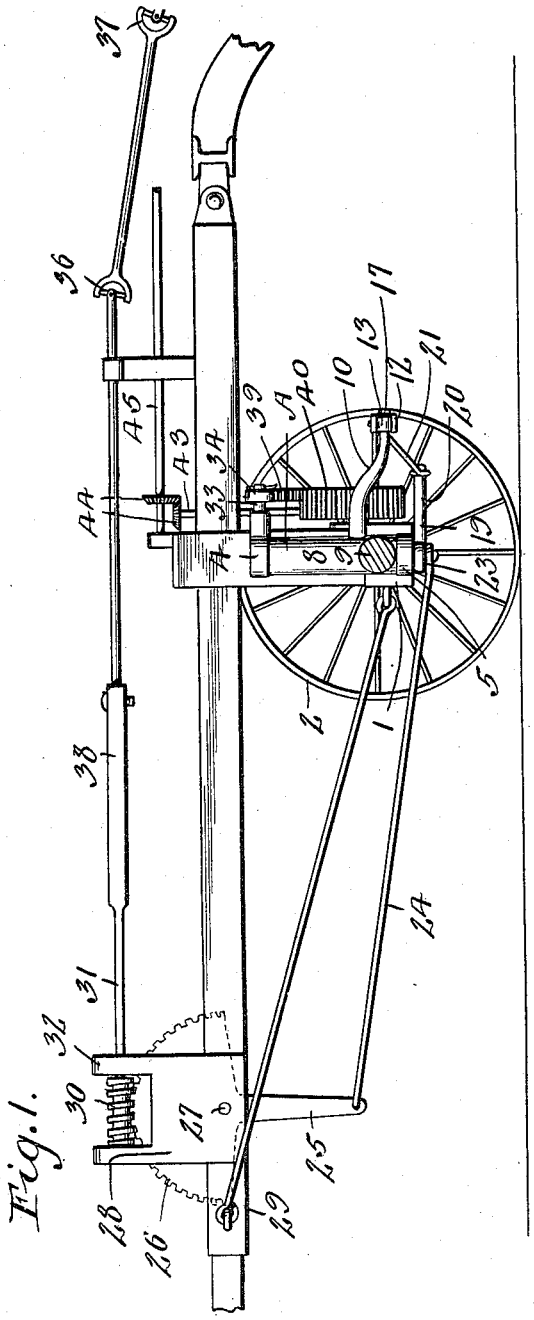
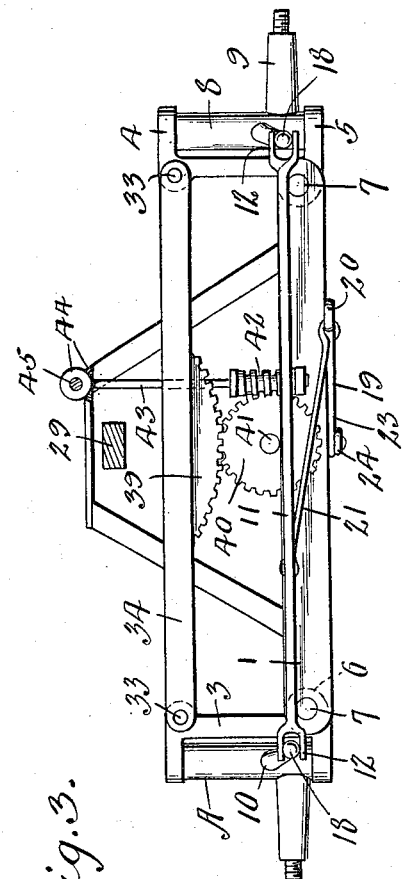
Inventor
A. C. Cox,
By Victor J. Evans
Attorney
Witnesses

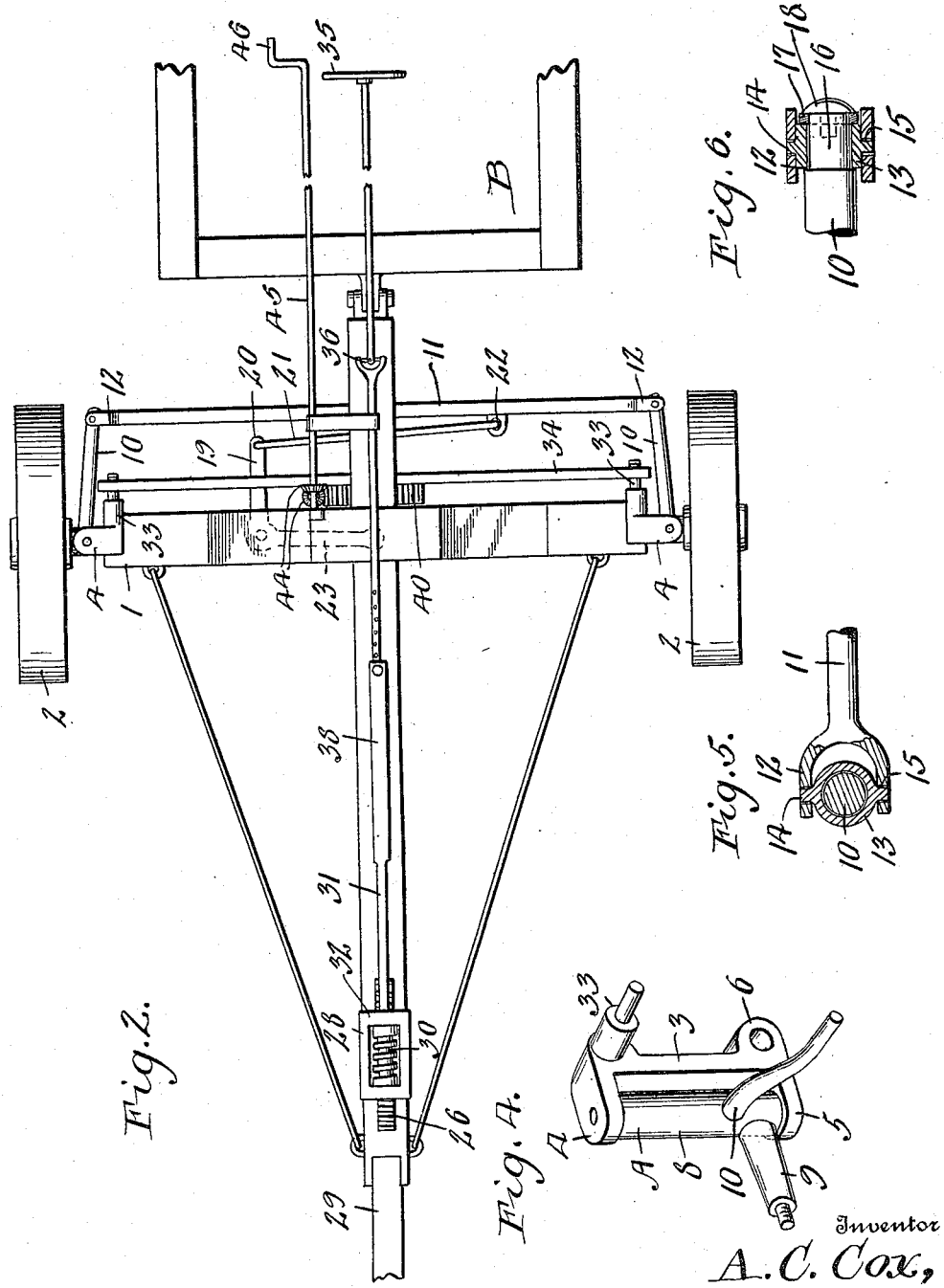

UNITED STATES PATENT OFFICE.

ALONZO CHLOE COX, OF KEOSANQUA, IOWA.

STEERING MECHANISM FOR WHEELED VEHICLES.

1,175,716.   Specification of Letters Patent.   Patented Mar. 14, 1916.

Application filed February 24, 1915. Serial No. 10,338.

*To all whom it may concern:*

Be it known that I, ALONZO CHLOE COX, a citizen of the United States, residing at Keosanqua, in the county of Van Buren and State of Iowa, have invented new and useful Improvements in Steering Mechanism for Wheeled Vehicles, of which the following is a specification.

This invention relates to steering mechanism particularly designed for use in connection with all kinds of vehicles and particularly motor driven vehicles, the main object of the present invention being to produce steering mechanism in which the steering knuckles have a pivotal connection with the axle on axes which admit of the lateral rocking movement of the wheels in side hill work or on an incline without impairing the efficiency of the ordinary steering mechanism, the steering of the vehicle being just as easily effected when the vehicle or machine is operating on a side hill or incline as when operating on a level.

With the above and other objects in view, the invention consists in the novel construction, combination and arrangement of parts, as herein described, illustrated and claimed.

In the accompanying drawings:—Figure 1 is a side elevation partly in section illustrating the steering mechanism of this invention. Fig. 2 is a plan view of the same. Fig. 3 is an end elevation of the steering mechanism. Fig. 4 is a detail perspective view of one of the hangers. Fig. 5 is a section taken through one of the knuckle arm joints. Fig. 6 is a section taken at right angles to Fig. 5.

Referring to the drawings 1 designates the axle of the vehicle with which axle the steering wheels are associated, 2 designating the steering wheels.

In carrying out the invention, I provide in connection with each steering knuckle, a knuckle hanger which embodies a substantially upright portion 3 having at its upper and lower ends outwardy extending arms 4 and 5 and also provided adjacent to the lower arm with an enlargement 6 through which extends a pivot 7 the opposite ends of which are supported by the adjacent end of the axle 1 as clearly shown in the drawings. The pivots 7 are parallel to each other and extend horizontally in fore and aft direction, thus permitting the knuckle hangers to rock in substantially vertical planes and transversely with respect to the line of draft of the vehicle or machine.

In connection with the knuckle hangers, I employ the knuckles designated generally at A, each knuckle comprising an upright portion 8, a spindle 9 and an operating arm 10, the upright portion 8 being mounted to turn between and being connected to the upper and lower arms 3 and 4 of the knuckle hanger. The knuckle arms are yoked together by an equalizing or connecting member 11 having the opposite ends thereof forked as shown at 12. In each forked end of the equalizing member 11 there is mounted a swivel eye 13, the same being provided with the oppositely extending vertically disposed pintles 14 which are received in openings 15 in the forked ends of the equalizing member. The extremities of the knuckle arms are reduced and rounded as indicated at 16 and inserted through said swivel eyes so that they may turn freely therein, a washer 17 being applied to the extremity of the knuckle arm and being secured in fixed relation thereto by means of a fastener such as a cap screw or stud bolt 18. This provides a universal joint between the opposite extremities of the equalizing or connecting member 11 and the operating arms of the knuckles.

Connected pivotally to the axle 1 is a bell crank lever 19 one arm 20 of which has attached thereto a rod 21 the other extremity of which has a jointed connection at 22 with the equalizing member 11. The other arm 23 of said lever has connected thereto the forward extremity of an operating rod 24. The opposite end of this rod has a jointed connection with the downwardly extending arm 25 of a sector gear 26 which is pivotally mounted at 27 in a bracket or casting 28 secured in fixed relation to the tongue or reach 29 of the vehicle. Coöperating with said sector gear is a worm 30 mounted on a steering shaft 31 which is journaled in bearing extensions 32 of said bracket. It will now be seen that by turning the shaft 31, the worm coöperates with the sector gear to swing the arm thereof and thereby operate the remainder of the steering mechanism hereinabove described. At any time, the wheels will accommodate themselves to the angularity or inclination of the axle 1 thereby particularly adapting the vehicle for use in side hill work. On account of the universal joints between the knuckle operating arms and the equalizing or connecting member 11, the efficiency of the steering mechanism will not be impaired and may be operated with the same ease as when the vehicle is traveling on level ground.

The knuckle hangers are provided with pintles 33 extending in a fore and aft direction and connected by means of a yoke or connecting bar 34 which causes both knuckle hangers to swing simultaneously and equally when either one of them is affected. This insures the maintenance of the steering wheels in parallel relation to each other at all times.

If desired, the steering shaft 31 may be made of any desired length and provided at one end with a hand wheel 35 and a plurality of universal joints 36 and 37 at suitable points in the length thereof and also provided with a slip joint 38 to allow for lengthening and shortening the steering shaft as a whole. This adapts the steering mechanism to be operated by a person standing on a machine such as a road scraper, for example, hitched to and traveling in rear of the vehicle in connection with which the steering mechanism hereinabove described is used.

In order to provide for adjusting the pitch or inclination of the steering wheels relatively to the body of the machine when on a hill side, the yoke or connecting bar 34 is provided with an arcuate rack face 39 which meshes with and is operated by a spur gear 40 fast on a short horizontal shaft 41 extending longitudinally of the machine and mounted in suitable bearings on the axle, said wheel 40 being operated by a worm 42 fast on a vertical worm shaft 43 the upper end of which is connected by miter gears 44 to a substantially horizontal operating shaft 45 provided at its extremity with a handle 46 shown in the form of a crank. The operator by turning the handle 46 and thereby the shaft 45 is enabled to move the yoke or connecting bar 34 in either direction for the purpose of rocking the knuckle hangers 3 on their horizontal pivots formed by the bolts or pins 7 hereinabove referred to. Furthermore when the desired adjustment of the knuckle hangers has been obtained, the worm 42 acts as a lock to hold the parts in the position to which they have been adjusted.

What I claim is:—

1. In steering mechanism for wheeled vehicles, the combination of an axle, knuckle hangers pivotally connected to the opposite ends of the axle to oscillate on substantially horizontal axes, a link directly connecting said hangers for causing them to oscillate equally and simultaneously, an arcuate rack face on said link, a pinion meshing with said rack face, steering knuckles pivotally supported by said hangers to oscillate on substantially vertical axes, an equalizing member connecting said knuckles, and manually operable means for turning said knuckles.

2. In steering mechanism for wheeled vehicles, the combination of an axle, knuckle hangers pivotally connected to the opposite ends of the axle to oscillate on substantially horizontal axes, means for oscillating said hangers on their horizontal axes, steering knuckles pivotally supported by said hangers to oscillate on substantially vertical axes, an equalizing member connecting said knuckles, manually operable means for turning said knuckles comprising a bell crank lever supported by said axle, a link connecting said lever and equalizing member, a steering shaft, a sector geared to said shaft, an arm extending from said sector, and a connecting rod between said arm and lever.

In testimony whereof I affix my signature in presence of two witnesses.

ALONZO CHLOE COX.

Witnesses:
R. E. MORRISON,
D. M. LAZENBY.